US011305887B2

United States Patent
Perry et al.

(10) Patent No.: US 11,305,887 B2
(45) Date of Patent: Apr. 19, 2022

(54) METHOD AND SYSTEM FOR DETECTING AND REMEDYING SITUATION AWARENESS FAILURES IN OPERATORS OF REMOTELY OPERATED VEHICLES

(71) Applicant: The Boeing Company, Chicago, IL (US)

(72) Inventors: Nathan C. Perry, Brisbane (AU); Jesse Lee Kresevic, Queensland (AU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/569,854

(22) Filed: Sep. 13, 2019

(65) Prior Publication Data

US 2021/0086910 A1    Mar. 25, 2021

(51) Int. Cl.
| | |
|---|---|
| *B64D 45/00* | (2006.01) |
| *B64D 47/02* | (2006.01) |
| *G05D 1/00* | (2006.01) |
| *B64D 47/08* | (2006.01) |
| *G08G 5/00* | (2006.01) |
| *G06K 9/00* | (2022.01) |

(52) U.S. Cl.
CPC ............ *B64D 45/00* (2013.01); *B64D 47/02* (2013.01); *B64D 47/08* (2013.01); *G05D 1/0022* (2013.01); *G06K 9/00604* (2013.01); *G08G 5/0026* (2013.01)

(58) Field of Classification Search
CPC ........ B64D 45/00; B64D 47/02; B64D 47/08; G05D 1/0022; G06K 9/00604; G08G 5/0026

USPC ......................................................... 340/945
See application file for complete search history.

(56) References Cited

U.S. PATENT DOCUMENTS

| | | | | |
|---|---|---|---|---|
| 9,685,010 | B1 * | 6/2017 | Chan .................. | G06K 9/00845 |
| 10,372,202 | B1 * | 8/2019 | Greenspan ............. | G06F 3/033 |
| 2016/0027336 | A1 * | 1/2016 | Towers .............. | G06K 9/00288 |
| | | | | 434/35 |
| 2017/0041587 | A1 * | 2/2017 | Wei ........................ | H04N 13/25 |

(Continued)

OTHER PUBLICATIONS

Website printout showing Tobii Pro X2 Eye Tracker, https://www.tobiipro.com/product-listing/tobii-pro-x2-30/06.06.2019, Tobii AB, 2019.

(Continued)

*Primary Examiner* — Kerri L McNally
(74) *Attorney, Agent, or Firm* — Ostrager Chong Flaherty & Broitman P.C.

(57) ABSTRACT

A system and method that detect situation awareness failures in operators of remotely operated vehicles and consequently alert the operators and/or activate a fail-safe mode in the vehicles to reduce potential for an accident. Real-time values of indicators displayed on a control station are periodically stored in a database and compared to inspected values of each indicator stored when the operator last viewed each indicator to determine if there is a difference representing an operator's level of awareness. An eye-tracking system is used to monitor the operator's point-of-gaze and awareness of each indicator. If there is a difference beyond an acceptable level of deviation between the real-time value and the inspected value, the system alerts the operator and/or commands the remotely operated vehicle to commence a fail-safe operation.

20 Claims, 6 Drawing Sheets

(56) References Cited

U.S. PATENT DOCUMENTS

2018/0260024 A1* 9/2018 Maltz ............... G06F 3/013
2019/0310630 A1* 10/2019 Taveira ............ G05D 1/0011

OTHER PUBLICATIONS

Instruction Manual for Tobii Pro X2 Eye Tracker, Version 1.0.3, Jun. 2014, Tobii technology AB.

* cited by examiner

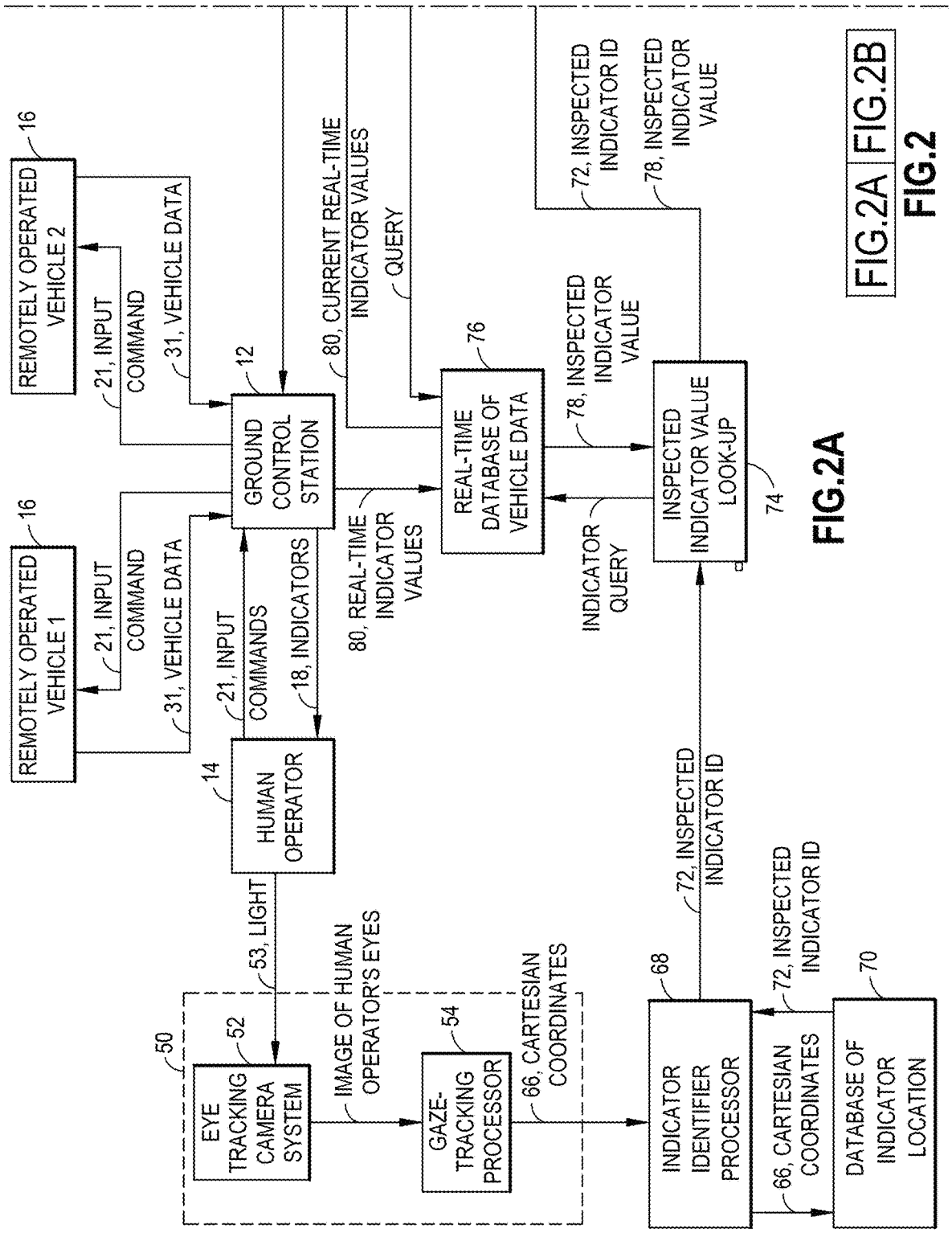

METHOD AND SYSTEM FOR DETECTING AND REMEDYING SITUATION AWARENESS FAILURES IN OPERATORS OF REMOTELY OPERATED VEHICLES

TECHNICAL FIELD

This disclosure relates to a method and system for detecting instances in which an operator of a remotely operated vehicle has lost awareness of a current control state of the remotely operated vehicle and consequently alerting the operator and/or activating a fail-safe mode in the remotely operated vehicle to reduce potential for an accident.

BACKGROUND

Operators of remotely operated vehicles, such as a remotely piloted aircraft system ("RPAS"), are expected to identify and scan high-priority information being displayed on a control station representing the current state of control instruments on the remotely operated vehicles and to appropriately manage their workload and attention to ensure successful performance of the remotely operated vehicle. Maintaining awareness of the displayed information enables the operator to command changes in operation of the remotely operated vehicles should the need arise. However, operators of remotely operated vehicles may be subjected to periods of high workload, stress and fatigue which may have a negative impact on performance. In addition, there is a push to improve the commercial viability of RPAS and other systems for operating remote vehicles by moving from an operational model where a single operator manages a single remotely operated vehicle (i.e., one-to-one) to an operational model where a single operator simultaneously manages multiple remotely operated vehicles (i.e., one-to-many). As the number of vehicles that a single operator is expected to manage increases, competition for the operator's limited attention resources also increases, particularly in complex situations.

It is therefore desirable to provide a method and system for detecting instances in which an operator of a remotely operated vehicle has lost awareness of a current control state of the remotely operated vehicle and consequently alerting the operator and/or activating a fail-safe mode in the remotely operated vehicle to improve effective management of the remotely operated vehicle and reduce potential for an accident.

BRIEF DESCRIPTION

The subject matter disclosed in some detail below is directed to a method and system for detecting and remedying a situation awareness failure in an operator of one or more remotely operated vehicles. The method and system are applicable to any type of vehicle suitable for remote operation including, but not limited to, aircrafts (for example, airplanes, helicopters, drones, spacecraft, and the like), automobiles, and watercraft, and to any type of control station for operating remote vehicles that includes a display containing indicators representing the current state of control instruments in the remote vehicle.

In one aspect of the method of the disclosure, the locations of one or more indicators contained within a display of a control station for remotely operating the remotely operated vehicle are stored in a database. The method further monitors a point-of-gaze of the operator of the control station using an eye tracker device positioned proximate the display of the control station and stores an inspected value of each indicator when the operator's point-of-gaze intersects the location of the indicator within the display of the control station. The inspected value of each indicator represents an inspected operating state of the control instrument in the remotely operated vehicle that corresponds to each indicator at a time when the operator last inspected each indicator. The inspected value of the indicators is stored at a frequency between 30 Hz and 400 Hz, preferably around 60 Hz. A real-time value of each indicator is also stored periodically, such as at a frequency between 30 Hz and 400 Hz. The real-time value represents a current operating state of the control instrument in the remotely operated vehicle that corresponds to each indicator. The method performs a comparative analysis comparing the real-time value with the inspected value of one or more indicators displayed at the control station and assessing a situation awareness of the operator based on the results of the comparative analysis.

In another aspect of the disclosed method, if the situation awareness of the operator is assessed to be insufficient, the operator is alerted of the insufficient awareness of one or more indicators and a timer is started providing the operator with a specified time to remedy the situation awareness. If the operator fails to remedy the insufficient situation awareness before the time on the timer expires, the control station sends a command to the remotely operated vehicle to activate a fail-safe control mode in the remotely operated vehicle. If the operator remedies the insufficient situation awareness before the time on the timer expires, the monitoring and storing steps continue without any further intervention by the control station. Alternatively, when the situation awareness of the operator is assessed to be insufficient, the control station can send a command to activate a fail-safe control mode in the remotely operated vehicle without any delay.

In yet another aspect of the disclosed method, the step of assessing the situation awareness of the operator includes determining if a difference between the real-time value and the inspected value of each indicator exceeds a threshold for an acceptable level of deviation between the real-time value and the inspected value for each indicator. If the difference between the real-time value and the inspected value exceeds the threshold for the acceptable level of deviation between the real-time value and the inspected value of each indicator, the situation awareness of the operator is assessed to be insufficient, the operator is alerted of the insufficient awareness of one or more indicators, and a timer is started providing the operator with a specified time to remedy the situation awareness. If the operator fails to remedy the insufficient situation awareness before the timer expires, a command is sent by the control station to activate a fail-safe control mode in the remotely operated vehicle. If the operator remedies the insufficient situation awareness before the time on the timer expires, the monitoring and storing steps continue without any further intervention by the control station. Alternatively, if the difference between the real-time value and the inspected value of the indicators exceeds the threshold for the acceptable level of deviation between the real-time value and the inspected value of each indicator, the control station can send a command to activate a fail-safe control mode in the remotely operated vehicle without any delay.

Each indicator in the control station may have a different threshold for the acceptable level of deviation or may have more than one threshold for acceptable levels of deviation. For example, exceeding a first threshold may provide an alert to the operator and start the timer so the operator has an opportunity to remedy the insufficient awareness and exceeding a second threshold may automatically send a command to activate a fail-safe control mode in the remotely operated vehicle without any intervention by the operator. Alternatively, exceeding the thresholds for a combination of indicators may be required before an alert is sent to the operator and/or a command is sent to activate the fail-safe control mode in the remotely operated vehicle.

In other aspects of the disclosure, a system for detecting and remedying a situation awareness failure of an operator of one or more remotely operated vehicles using one or more control stations includes an eye tracker device for monitoring a point-of-gaze of the operator. The eye tracker device is positioned proximate a display of the one or more control stations, which contains one or more indicators for monitoring the current state of instruments in the remote vehicle. In systems monitoring more than one remotely operated vehicles, additional displays could be used for each additional remotely operated vehicle, or a single display could have a split-screen for monitoring different remotely operated vehicles. The system includes one or more databases for storing (i) a location of one or more indicators contained within the display, (ii) an inspected value of each of the indicators when the point-of-gaze of the operator intersects the location of each of the indicators, and (iii) a real-time value of each indicator.

The inspected value of each indicator represents an inspected operating state of the control instrument in the remotely operated vehicle that corresponds to each indicator at a time when the operator last inspected each indicator. The inspected value of the indicators is stored at a frequency between 30 Hz and 400 Hz, preferably around 60 Hz. A real-time value of each indicator is also stored periodically, such as at a frequency between 30 Hz and 400 Hz. The real-time value represents a current operating state of the control instrument in the remotely operated vehicle that corresponds to each indicator. The system also includes a computing device programmed to receive the inspected values and the real-time values of the indicators from the one or more databases, and to perform a comparative analysis comparing the real-time value with the inspected value of each indicator to assess a situation awareness of the operator based on the results of the comparative analysis.

In another aspect of the disclosed system, the computing device is further programmed such that if the comparative analysis shows that the situation awareness of the operator is insufficient, the operator is alerted of the insufficient awareness of one or more indicators and a timer is started providing the operator with a specified time to remedy the situation awareness. If the operator fails to remedy the insufficient situation awareness before the time on the timer expires, the computing device is programmed to send a command to activate a fail-safe control mode in the remotely operated vehicle. If the operator remedies the insufficient situation awareness before the time on the timer expires, the computing device is programmed to continue monitoring and storing the inspected values and real-time values of the indicators and performing the comparative analysis without any further intervention by the control station. Alternatively, when the situation awareness of the operator is assessed to be insufficient, the computing device can be programmed to send a command to activate a fail-safe control mode in the remotely operated vehicle without any delay.

In another aspect of the system, the computing device is programmed to determine if a difference between the real-time value and the inspected value of each indicator exceeds a threshold for an acceptable level of deviation between the real-time value and the inspected value of the indicator. If the difference between the real-time value and the inspected value exceeds the threshold for the acceptable level of deviation between the real-time value and the inspected value of any indicator, the operator is alerted of the insufficient awareness of the indicator and a timer is started providing the operator with a specified time to remedy the situation awareness failure. If the operator fails to remedy the insufficient situation awareness before the timer expires, the computing device is programmed to send a command to activate a fail-safe control mode in the remotely operated vehicle. If the operator remedies the insufficient situation awareness before the time on the timer expires, the computing device continues monitoring and storing the inspected values and real-time values for each indicator without any further intervention by the control station. Alternatively, if the difference between the real-time value and the inspected value of any of the indicators exceeds the threshold for the acceptable level of deviation between the real-time value and the inspected value, the computing device is programmed to send a command to activate a fail-safe control mode in the remotely operated vehicle without any delay.

In the disclosed system, each indicator in the control station may have a different threshold for the acceptable level of deviation or may have more than one threshold for acceptable levels of deviation. For example, exceeding a first threshold may provide an alert to the operator and start the timer so the operator has an opportunity to remedy the insufficient awareness and exceeding a second threshold may automatically send a command to activate a fail-safe control mode in the remotely operated vehicle. Alternatively, the computing device may be programmed to require exceeding the thresholds for a combination of indicators before an alert is sent to the operator and/or a command is sent to activate the fail-safe control mode in the remotely operated vehicle.

In yet another aspect of the disclosure, the system and method as disclosed above are used in one or more ground control systems for detecting and remedying a situation awareness failure of a remote pilot of one or more remotely piloted aircraft.

The features, functions, and advantages of the method and system that have been discussed, as well as other objects, features, functions, and advantages of the method and system disclosed herein can be achieved independently in various examples of the disclosure or may be combined in yet other examples further details of which can be seen with reference to the following description and drawings.

BRIEF DESCRIPTION OF THE DRAWINGS

Various implementations of the disclosure will be hereinafter described with reference to drawings for the purpose of illustrating the above-described and other aspects. None of the drawings briefly described in this section are drawn to scale.

FIG. 2 is a legend showing how partial views hereinafter described as FIG. 2A and FIG. 2B are intended to be viewed to form one complete view of a flowchart.

FIG. 2A is a left side of a flowchart providing a high-level view of data flow in a method and system for detecting and remedying situation awareness failures in operators of remotely operated vehicles.

Figure 1:
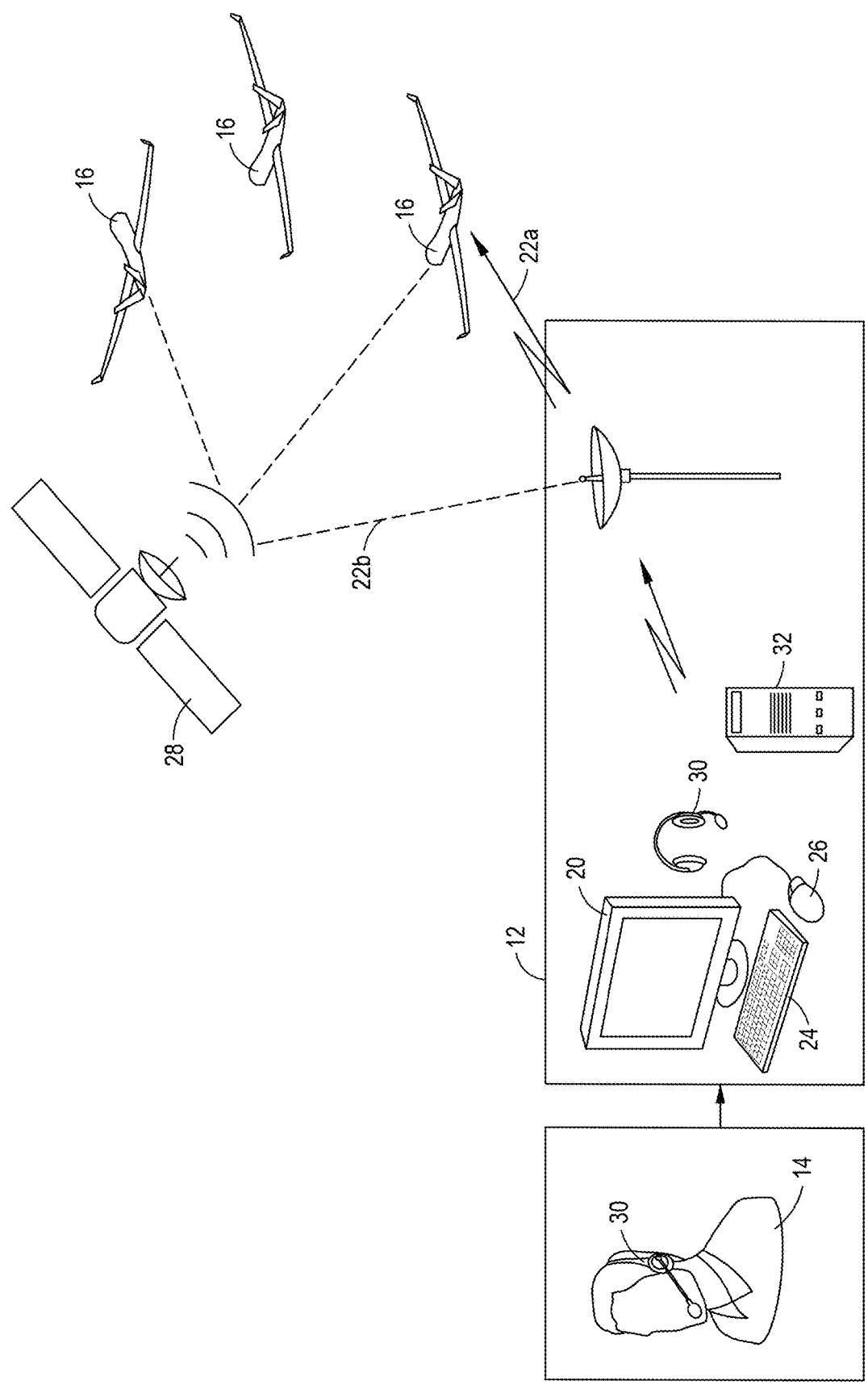
FIG. 1 is a block diagram representing communications between a ground control station and a remotely operated vehicle.

Reference will hereinafter be made to the drawings in which similar elements in different drawings bear the same reference numerals. Where reference is made in any one or more of the accompanying drawings to steps and/or features, which have the same reference numerals, those steps and/or features have, for the purposes of this description, the same function(s) or operators(s), unless the contrary intention is apparent.

DETAILED DESCRIPTION

Illustrative implementations of a method and system for detecting situation awareness failures in operators of remotely operated vehicles are described in some detail below. However, not all features of an actual implementation are described in this specification. A person skilled in the art will appreciate that in the development of any such actual implementation, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The method described herein may be encoded as executable instructions embodied in a non-transitory tangible computer-readable storage medium, including, without limitation, a storage device and/or a memory device. Such instructions, when executed by a processing or computing system, cause the system device to perform at least a portion of the method described herein.

In the following description, the disclosed method and system are described in the context of a remotely piloted aircraft system ("RPAS") as one non-limiting example of an application of the method and system. The method and system can readily be adapted for use with any other type of remotely operated vehicle.

Figure 2B:
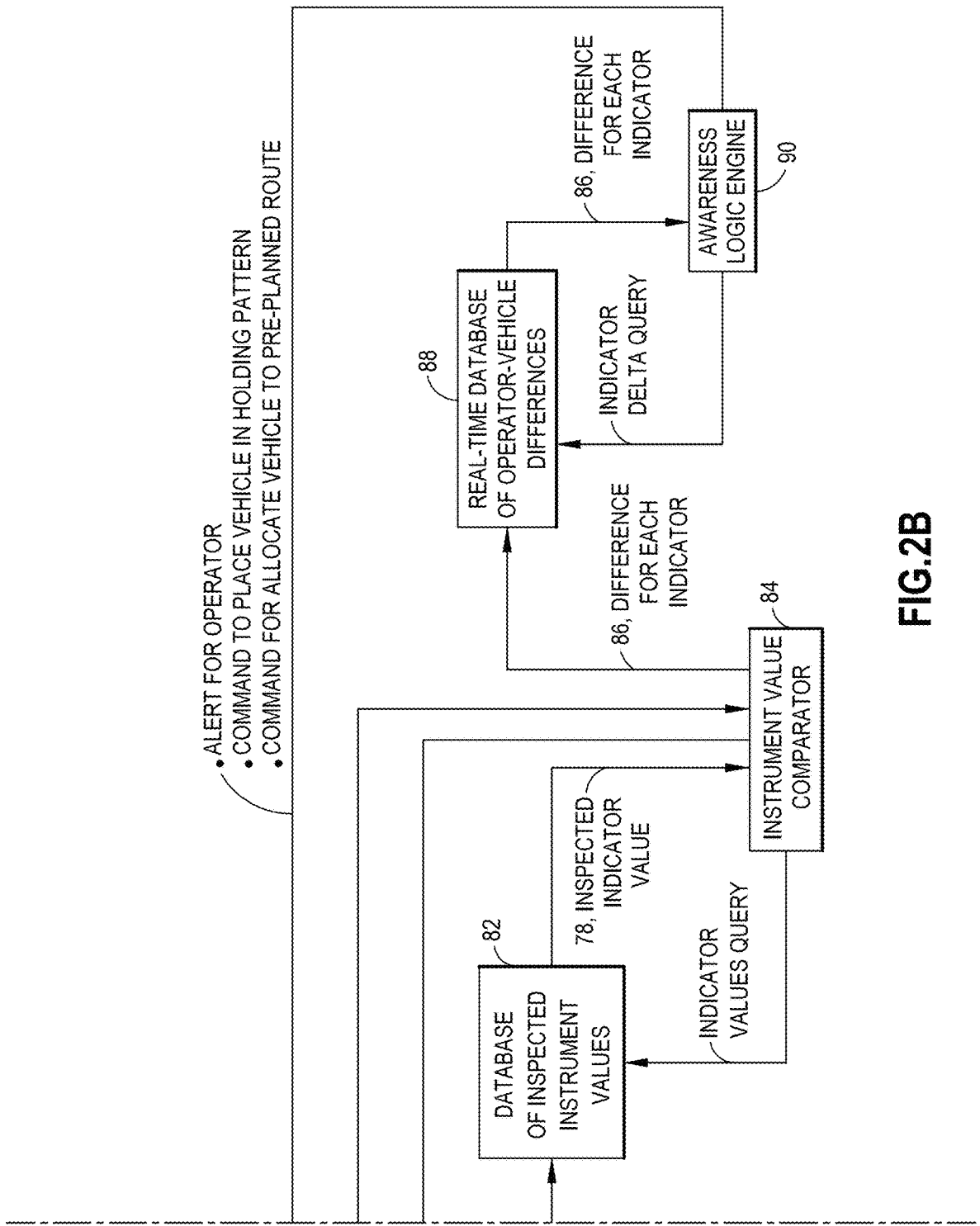
FIG. 2B is a right side of a flowchart providing a high-level view of data flow in a method and system for detecting and remedying situation awareness failures in operators of remotely operated vehicles.

FIG. 1 is a block diagram representing a high-level overview of a remotely piloted aircraft system 10 in accordance with the method and system disclosed herein. FIG. 2 is a flowchart providing a high-level view of data flow in the disclosed method and system for detecting and remedying a situation awareness failure in an operator 14 of one or more remotely operated vehicles 16 that can be implemented in various ways depending on the applications of interest.

The remotely piloted aircraft system 10 has a ground control station 12 that is operated by an operator 14 (in this example, a pilot). The operator 14 is responsible for monitoring and controlling one or more remotely operated vehicles 16 (in this example, aircraft) through interaction with the ground control station 12. More particularly, the operator 14 monitors one or more indicators 18 on one or more displays 20 of the ground control station 12 (see FIG. 2 discussed below) and provides input commands 21 to the ground control station 12 by keyboard 24 and/or mouse 26 (or other type of communications interface, including voice entry commands with headset 30) to control the remotely operated vehicles 16. Each of the indicators 18 displayed by the ground control station 12 represents an operating state of a control instrument on the remotely operated vehicles 16. Examples of aircraft that may be remotely operated using the disclosed method and system include the INTEGRATOR and SCANEAGLE unmanned aircraft systems available from Insitu Inc., Bingen, Wash., a Boeing Company.

The method and system monitor the operating state of each remotely operated vehicles 16 and the allocation of visual attention by the operator 14 to the indicators 18 displayed by the ground control station 12 for each of the remotely operated vehicles 16 to detect potential breakdowns in situation awareness for one or more remotely operated vehicles 16. When a breakdown in situation awareness is detected an alert is presented to the operator 14. If the situation awareness breakdown is not resolved, a fail-safe is initiated with a command sent from the ground control station 12 to one or more of the remotely operated vehicles 16 as appropriate to perform an action such as fly a pre-planned route or to fly a holding pattern at the current location until the situation awareness failure has been resolved.

The ground control station 12 receives input commands 21 from the operator 14 to make changes to the operation of the remotely operated vehicles 16 and sends the input commands 21 to one or more of the remotely operated vehicles 16 as indicated by the operator 14. The input commands 21 are transmitted from the ground control station 12 to the remotely operated vehicles 16 via a command and control data link 22, such as a Line of Sight command and control data link 22a directly to the remotely operated vehicles 16 or a Beyond Lind of Sight command and control data link 22b (via a space-based or terrestrial network satellite 28). Computers on-board the remotely operated vehicles 16 receive the input commands 21 via the command and control data link 22 and execute the commands to manipulate the control surfaces on the remotely operated vehicles 16. The remotely operated vehicles 16 send vehicle data 31 concerning the operating state of the remotely operated vehicles 16 to the ground control station 12 also via the command and control data link 22 to be displayed by the indicators 18 contained within the displays 20.

The ground control station 12 includes a computing device 32 that receives the vehicle data 31 from the remotely operated vehicles 16 and displays the vehicle data 31 to the operator 14 across a plurality of indicators 18 contained within the displays 20, each of the indicators 18 representing a current state of a control instrument on the remotely operated vehicles 16. In systems where the operator 14 is operating more than one of the remotely operated vehicles 16, a single one of the displays 20 may be used with a split-screen that shows the indicators 18 for each of the remotely operated vehicles 16 being monitored in different locations on the single one of the displays 20, or the operator 14 may use a single one of the displays 20 and toggle between screens for each of the remotely operated vehicles 16, or one or more additional displays 20 may be used, each of the displays 20 containing the indicators 18 for one of the remotely operated vehicles 16.

Figure 3:
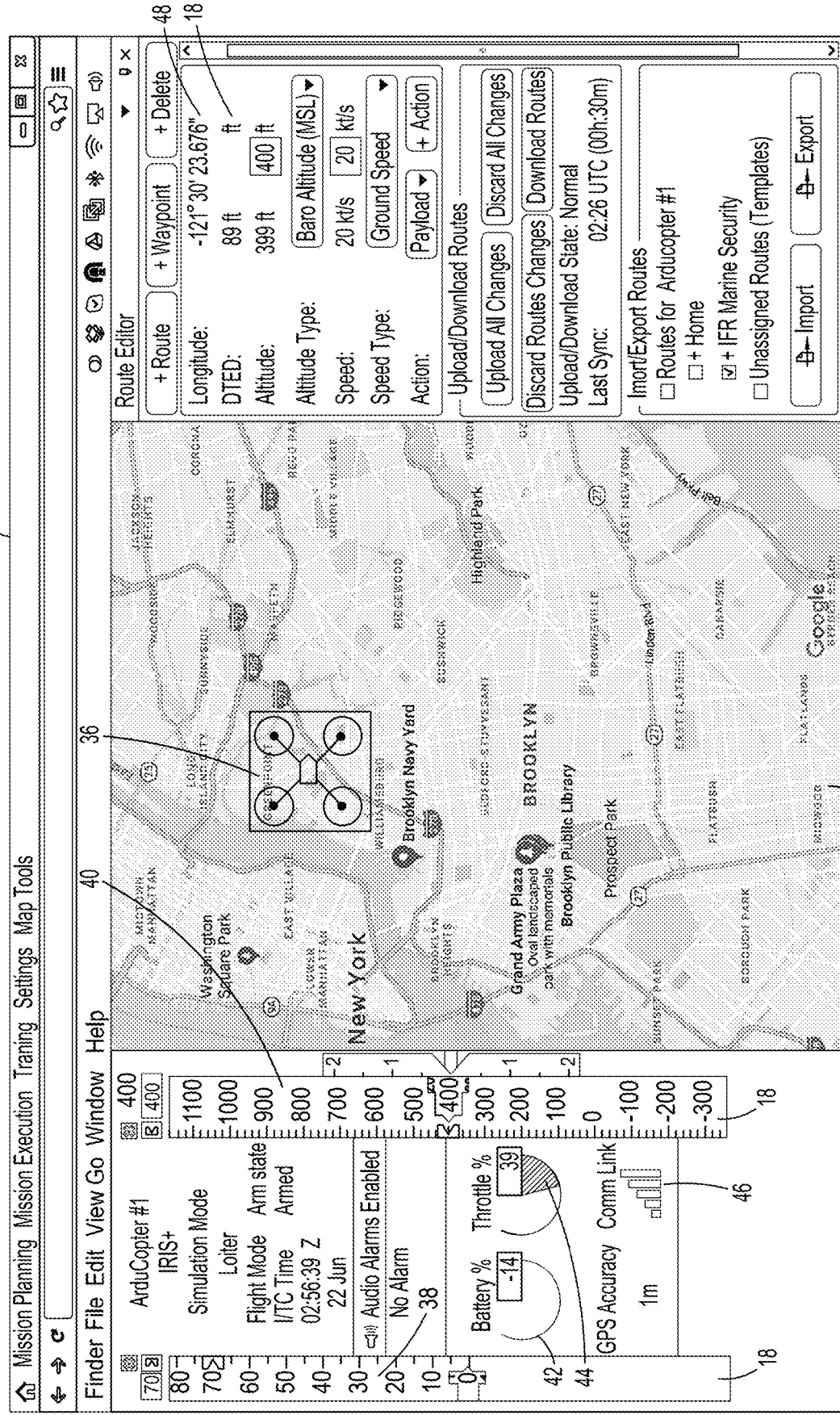
FIG. 3 is an illustrative screenshot of indicators displayed on a display of the ground control station representing a current operating state of a remotely operated vehicle.

FIG. 3 is an illustrative screenshot of indicators 18 displayed on one of the displays 20 of the ground control station 12, each of the indicators 18 representing a current operating state of control instruments on one of the remotely operated vehicles 16. Ground control software such as Insitu Inc.'s INEXA Control is run on the computing device 32 of the ground control station 12 to provide the functionality of the ground control station 12, including the indicators 18 on the displays 20. Some displays 20 shows 15-20 indicators 18 to the operator 14 representing vehicle data 31 including one or more of the following: a map 34, an icon 36 representing the location of one of the remotely operated vehicles 16 on the map 34, a live video feed from the remotely operated vehicle 16, and indicators 18 representing the operating status of the remotely operated vehicle 16 such as airspeed 38, altitude 40, battery power 42, throttle percentage 44, strength of communications link 46, and global positioning system GPS coordinates 48.

Figure 4:
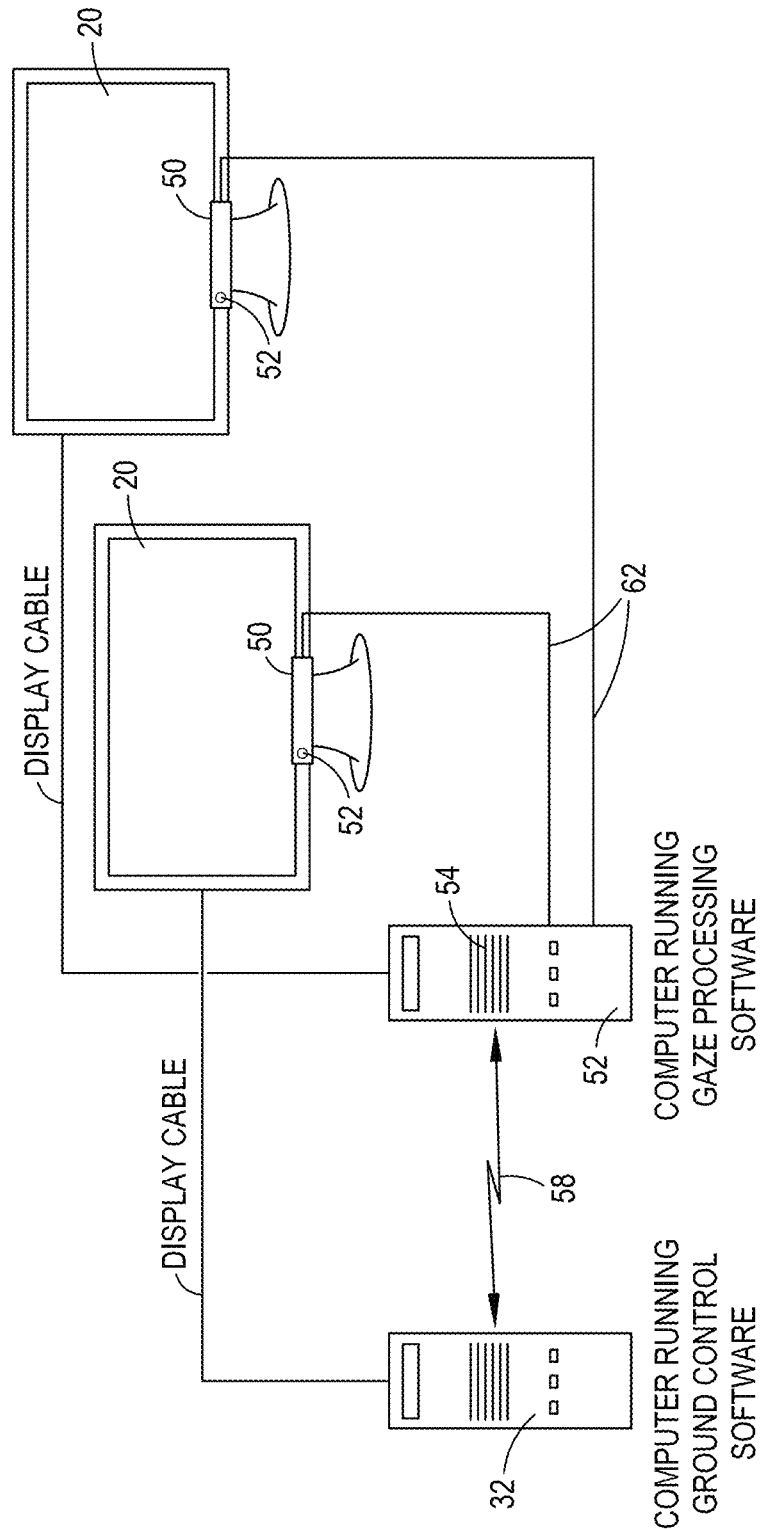
FIG. 4 is a block diagram representing components of a ground control station for use by an operator of a remotely operated vehicle.

FIG. 4 is a block diagram representing components of the ground control station 12 for use by an operator 14 of one or more remotely operated vehicles 16, including a computing device 32 running ground control software that provides remote operational control for one or more remotely operated vehicles 16 and displays vehicle data 31 concerning the operational state of the remotely operated vehicles 16 via a plurality of indicators 18 contained within one or more displays 20.

An eye tracker device 50 is provided and configured to non-invasively monitor and track the current direction of the visual gaze of the operator 14, referred to herein as the operator's point-of-gaze. In one implementation, the eye tracker device 50 includes an eye-tracking camera system 52 positioned proximate the one or more displays 20 and a gaze-tracking processor 54, which may run on the computing device 32 or a second computing device 56 that is operationally connected to the computing device 32 via ethernet or wireless communications 58. The eye-tracking camera system 52 may be positioned proximate a bottom, top or side portion of the displays 20. The computing device 32 may be connected to the one or more displays 20 via a display cable 60. The eye-tracking camera system 52 is connected to the computing device 32 or to the second computing device 56, if used, via an eye-tracking connection 62, which may be a universal serial bus (USB) or other type of cable, or a wireless connection, or over a computer network. In configurations of the ground control station 12 that include multiple displays 20, one eye-tracking camera system 52 may be positioned proximate to each of the displays 20, or one eye-tracking camera system 52 may be positioned proximate to and shared by all displays 20.

The eye-tracking camera system 52 includes an infrared light source that illuminates the eyes of the operator 14 and at least one camera that captures the location of the glint generated from the reflection of the infrared light on the cornea of the operator 14. One example of such an eye-tracking camera system 52 is the "Tobii Pro X2 eye tracker" available from Tobii AB, Danderyd, Sweden, which can be snapped into place on the displays 20 and configured such that the camera and infrared light source face the operator 14. Images of the operator's eyes, which include the corneal reflection, are sent from the camera to the gaze-tracking processor 54. The gaze-tracking processor 54 applies image processing algorithms to images of the eyes of the operator 14 received from the eye-tracking camera system 52. These algorithms enable detection of both the location of the pupil of the operator 14 and the location of the reflection of infrared light from the cornea of the operator 14. The point-of-gaze of the operator 14 is calculated from known geometry of the camera and infrared light sources in the eye-tracking camera system 52, the eyes of the operator 14, and the reflection of light on the cornea of the operator 14, and then converted to Cartesian coordinates 66 which represent an estimate of the point-of-gaze within the ground control station 12. Eye-tracking systems and their use in training pilots are discussed in more detail in commonly owned U.S. Publication No. 2016/0027336, the disclosure of which is incorporated by reference herein in its entirety.

Referring to FIG. 4, the gaze-tracking processor 54 sends the Cartesian coordinates 66 of the point-of-gaze of the operator 14 to an indicator identifier processor 68 to determine which of the indicators 18 the operator 14 is looking at. The indicator identifier processor 68 queries an indicator location database 70 where coordinates representing a location of each of the indicators 18 within the displays 20 of the ground control station 12 are stored and associated with an indicator identifier for each of the indicators 18. The coordinates for the top-left, top-right, bottom-left, and bottom-right position of each of the indicators 18 are stored. Thus, by querying the indicator location database 70, the indicator identifier processor 68 identifies the indicator identifier for the one of the indicators 18 that is associated with the Cartesian coordinates 66 of the point-of-gaze of the operator 14, referred to herein as the inspected indicator ID 72.

The inspected indicator ID 72 is sent to an inspected indicator value look-up 74, which queries a real-time database of vehicle data 76 with the inspected indicator ID 72 and returns an inspected value 78 associated with the inspected indicator ID 72, which represents an inspected operating state of the remotely operated vehicles 16 at a time when the operator 14 last inspected the one of the indicators 18 associated with the inspected indicator ID 72 or when the point-of-gaze of the operator 14 intersects the location of the one of the indicators 18 associated with the inspected indicator ID 72.

The real-time database of vehicle data 76 periodically receives updates of the current real-time indicator values 80 of each of the indicators 18 from the ground control station 12 and stores the current real-time indicator values 80 in association with the indicator identifier for each of the indicators 18. The current real-time indicator values 80 of each of the indicators 18 represent a current operating state of the remotely operated vehicles 16 and are stored in the real-time database of vehicle data 76 at a high frequency such as between 30 Hz and 400 Hz.

The inspected value 78 and the associated inspected indicator ID 72 are sent from the inspected indicator value look-up 74 to a database of inspected instrument values 82, which stores the association between the inspected indicator ID 72 and the inspected value 78 at the time of the last inspection by the operator 14 (i.e., the last time the point-of-gaze of the operator 14 intersects the location of the indicator associated with the inspected indicator ID 72).

A comparative analysis is performed substantially continuously to compare the current real-time indicator values 80 of each of the indicators 18 that is stored in the real-time database of vehicle data 76 with the inspected value 78 of each of the indicators 18 that is stored in the database of inspected instrument values 82. Thus, in the disclosed system and method, the point-of-gaze of the operator 14 is used to retrieve and update the last inspected value 78 of each of the indicators 18 for comparison to the current real-time indicator values 80 of each of the indicators 18. An instrument value comparator 84 receives the inspected value 78 of each of the indicators 18 at the time it was last inspected by the operator 14 and the current real-time indicator values 80 for each of the indicators 18, as well as the indicator identifiers associated with the values, and calculates a difference 86 between current real-time indicator values 80 and the inspected value 78 for each of the indicators 18. The calculated difference 86 represents a degree that the potential awareness of the operator 14 of each of the indicators 18 aligns with reality. The difference 86 between the inspected value 78 of each of the indicators 18 at the time it was last inspected by the operator 14 and the current real-time indicator values 80 for each of the indicators 18 is associated with the indicator identifier for each of the indicators 18 and stored in a real-time database of operator-vehicle differences 88.

All of the databases referred to in this disclosure may be relational databases or any other type of database suitable for storing the type of information and data disclosed herein. In addition, all of the databases referred to herein may be configured as a single database with two or more subdivisions within the single database or as separate databases.

Figure 5:
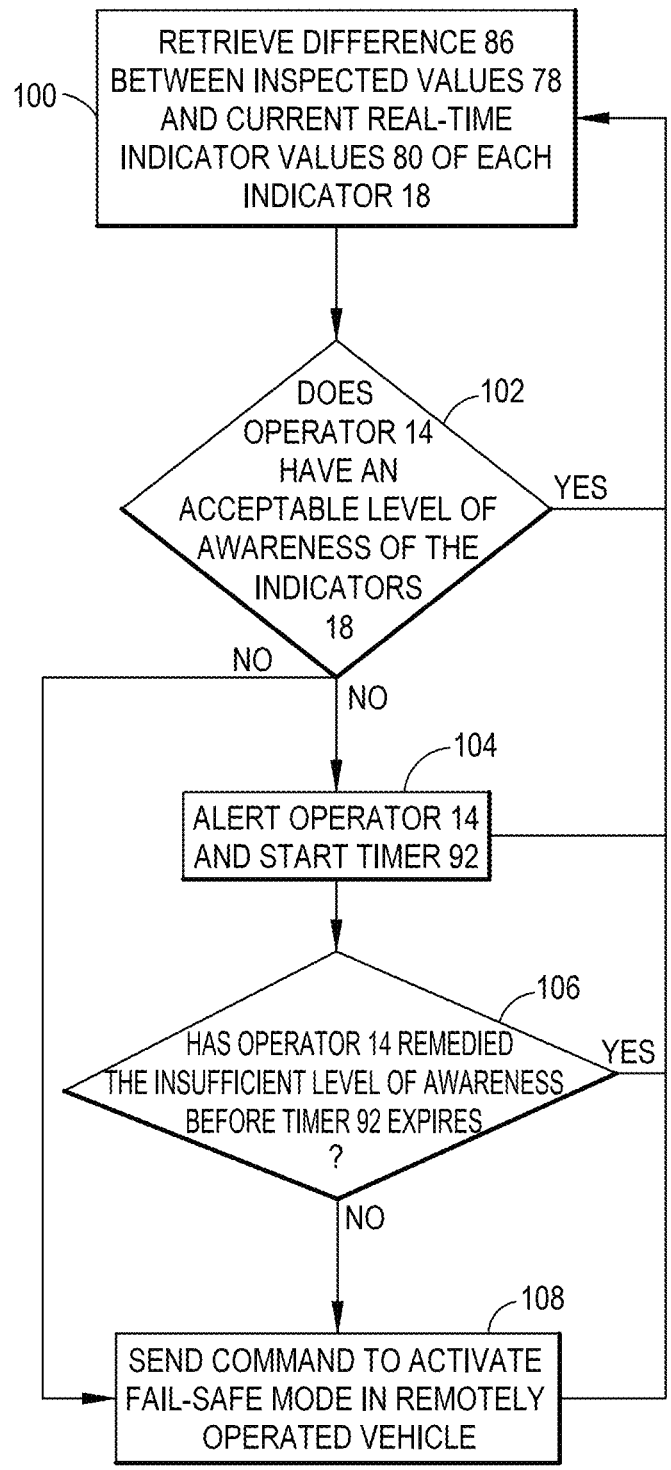
FIG. 5 is a flowchart showing the method steps of awareness logic engine in the method and system for detecting and remedying situation awareness failures in operators of remotely operated vehicles.

An assessment of the situation awareness of the operator 14 is substantially continuously made based on the results of the comparative analysis and appropriate actions are taken based on the assessment as shown in the flow chart of FIG. 5. In step 100, an awareness logic engine 90 (shown in FIG. 2) retrieves the difference 86 between the inspected value 78 of each of the indicators 18 at the time it was last inspected by the operator 14 and the current real-time indicator values 80 of each of the indicators 18, and determines in step 102 if the operator 14 has an acceptable level of awareness of each of the indicators 18 and the remotely operated vehicles 16. If the awareness logic engine 90 determines that the operator 14 has an acceptable level of awareness of each of the indicators 18, the method returns to step 100 to continue monitoring and retrieving the difference 86 between the inspected value 78 and current real-time indicator values 80 for each of the indicators 18.

If the awareness logic engine 90 determines that the operator 14 has an insufficient level of awareness of each of the indicators 18, there are two options. In the first option, in step 104, the awareness logic engine sends a signal to the ground control station 12 to alert the operator 14 to the insufficient level of awareness with a visual and/or auditory alert and to start timer 92 to provide the operator 14 with an opportunity to remedy the insufficient level of awareness. Thus, the method returns step 100 and step 102 to determine if the operator 14 has an acceptable level of awareness before the timer 92 expires. In step 106, the awareness logic engine 90 determines whether the operator 14 remedied the insufficient level of awareness before the timer 92 expires. If the awareness logic engine 90 determines that the operator 14 has remedied the insufficient level of awareness of each of the indicators 18, the method returns to step 100 to continue monitoring and retrieving the difference 86 between the inspected value 78 and current real-time indicator values 80 of each of the indicators 18. If the awareness logic engine 90 determines that the operator 14 has not remedied the insufficient level of awareness of each of the indicators 18, in step 108, the awareness logic engine 90 sends a command to the ground control station 12, which sends a command to the one or more of the remotely operated vehicles 16 for which the operator 14 has insufficient awareness to activate a fail-safe control mode. Exemplary fail-safe control modes include maintaining the remotely operated vehicles 16 in a holding pattern at its current location and sending the remotely operated vehicles 16 to a pre-defined waypoint by travelling a pre-planned route. In the second option, the awareness logic engine 90 skips steps 104 and 106, and immediately goes to step 108 to send a command to the ground control station 12, which sends a command to one or more of the remotely operated vehicles 16 for which the operator 14 has insufficient awareness to activate a fail-safe control mode without delay or opportunity for the operator 14 to remedy the insufficient level of awareness.

Step 102 in the awareness logic engine 90 of determining whether the operator 14 has a sufficient level of awareness of each of the indicators 18 may apply multiple criteria and specify one or more thresholds for an acceptable level of deviation between the inspected value 78 of each of the indicators 18 at the time it was last inspected by the operator 14 and the current real-time indicator values 80 of each of the indicators 18. For example, if the threshold for the acceptable level of deviation for airspeed 38 is set for 15 knots, any difference 86 calculated to be greater than 15 knots would signal that the operator 14 has an insufficient level of awareness, and the steps 100-108 would be used to determine if further action is necessary. Each indicator may have multiple thresholds. For example, a first threshold for the one of the indicators 18 for airspeed 38 may be set for 10 knots and a second threshold for the same one of the indicators 18 may be set for 15 knots. If the difference 86 is calculated to be greater than 10 knots but less than 15 knots, the awareness logic engine 90 could be programmed to perform steps 104, 106, and 108, providing the opportunity to remedy the insufficient level of awareness. If the difference 86 is calculated to be greater than 15 knots, the awareness logic engine 90 could be programmed to skip steps 104 and 106 and go directly to step 108 to activate a fail-safe control mode without delay. In addition, the awareness logic engine 90 could be programmed to apply multiple criteria, such as requiring more than one indicator to be beyond the threshold before determining in step 102 that the operator 14 has insufficient situation awareness. For example, the method may require that the operator 14 have insufficient awareness of indicators 18 for both airspeed 38 and altitude 40 before proceeding to step 104 or 108. Further, the thresholds for each of the indicators 18 can vary depending values of other indicators 18. The awareness logic engine 90 can be programmed with infinite variables depending on the application and use of the disclosed method and system.

Many modifications of the system and method disclosed herein may occur to those skilled in the art upon reading the specification. The present application includes such modifications and is limited only by the scope of the claims. The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for detecting and remedying a situation awareness failure of an operator of a remotely operated vehicle, the method comprising:

storing a location of an indicator contained within a display of a control station for remotely operating the remotely operated vehicle;

monitoring a point-of-gaze of the operator of the control station;

storing an inspected value of the indicator representing an inspected operating state of the remotely operated vehicle at a time when the operator last inspected the indicator;

periodically storing a real-time value of the indicator, the real-time value representing a current operating state of the remotely operated vehicle;

performing a comparative analysis comparing the real-time value of the indicator with the inspected value of the indicator; and assessing a situation awareness of the operator based on the comparative analysis of the real-time value and the inspected value of the indicator.

2. The method of claim 1, further comprising alerting the operator and starting a timer if the situation awareness of the operator is assessed to be insufficient.

3. The method of claim 1, further comprising sending a command to activate a fail-safe control mode in the remotely operated vehicle if the situation awareness of the operator is assessed to be insufficient.

4. The method of claim 2, further comprising sending a command to activate a fail-safe control mode in the remotely operated vehicle if the operator fails to remedy an insufficient situation awareness before the timer expires.

5. The method of claim 1, wherein the step of assessing the situation awareness of the operator comprises determining if a difference between the real-time value of the indicator and the inspected value of the indicator exceeds a threshold for an acceptable level of deviation between the real-time value and the inspected value of the indicator.

6. The method of claim 5, further comprising alerting the operator and starting a timer if the difference between the real-time value of the indicator and the inspected value of the indicator exceeds the threshold for the acceptable level of deviation between the real-time value and the inspected value of the indicator.

7. The method of claim 5, further comprising sending a command to activate a fail-safe control mode in the remotely operated vehicle if the difference between the real-time value of the indicator and the inspected value of the indicator exceeds the threshold for the acceptable level of deviation between the real-time value and the inspected value of the indicator.

8. The method of claim 6, further comprising sending a command to activate a fail-safe control mode in the remotely operated vehicle if the operator fails to remedy an insufficient situation awareness before the timer expires.

9. The method of claim 1, wherein the real-time value of the indicator is stored at a frequency between 30 Hz and 400 Hz.

10. The method of claim 1, wherein inspected value of the indicator is stored at a frequency between 30 Hz and 400 Hz.

11. A system for detecting and remedying a situation awareness failure of an operator of a remotely operated vehicle, the system comprising:

an eye tracker device for monitoring a point-of-gaze of the operator;

one or more databases for storing (i) a location of an indicator contained within a display of a control station for remotely operating the remotely operated vehicle, (ii) an inspected value of the indicator when the point-of-gaze of the operator intersects the location of the indicator, the inspected value representing an inspected operating state of the remotely operated vehicle at a time when the operator last inspected the indicator, and (iii) a real-time value of the indicator, the real-time value representing a current operating state of the remotely operated vehicle; and a computing device programmed to receive the inspected value and the real-time value of the indicator from the one or more databases, and to assess a situation awareness of the operator based on a comparative analysis of the real-time value and the inspected value of the indicator.

12. The system of claim 11, wherein the computing device is programmed to alert the operator and start a timer if the situation awareness of the operator is assessed to be insufficient.

13. The system of claim 11, wherein the computing device is programmed to generate a command to activate a fail-safe control mode in the remotely operated vehicle if the situation awareness of the operator is assessed to be insufficient.

14. The system of claim 12, wherein the computing device is programmed to generate a command to activate a fail-safe control mode in the remotely operated vehicle if the operator fails to remedy an insufficient situation awareness before the timer expires.

15. The system of claim 11, wherein the computing device is programmed to determine if a difference between the real-time value of the indicator and the inspected value of the indicator exceeds a threshold for an acceptable level of deviation between the real-time value and the inspected value of the indicator.

16. The system of claim 15, wherein the computing device is programmed to alert the operator and start a timer if the difference between the real-time value of the indicator and the inspected value of the indicator exceeds the threshold for the acceptable level of deviation between the real-time value and the inspected value of the indicator.

17. The system of claim 15, wherein the computing device is programmed to generate a command to activate a fail-safe control mode in the remotely operated vehicle if the difference between the real-time value of the indicator and the inspected value of the indicator exceeds the threshold for the acceptable level of deviation between the real-time value and the inspected value of the indicator.

18. The system of claim 16, wherein the computing device is programmed to generate a command to activate a fail-safe control mode in the remotely operated vehicle if the operator fails to remedy an insufficient situation awareness before the timer expires.

19. A ground control system for detecting and remedying a situation awareness failure of a remotely piloted aircraft, the ground control system comprising:

a ground control station comprising a display;

an eye tracker device for monitoring a point-of-gaze of a pilot;

one or more databases for storing (i) a location of a plurality of indicators contained within the display for controlling the remotely piloted aircraft, (ii) inspected values of each of the indicators when the point-of-gaze of the remote pilot intersects the location of each of the indicators, the inspected values representing an inspected operating state of the remotely piloted aircraft at a time when a remote pilot last inspected each of the indicators, and (iii) real-time values of each of the indicators, the real-time values representing a current operating state of the remotely piloted aircraft; and a computing device programmed to receive the inspected value and the real-time value of each of the indicators from the one or more databases, and to assess a situation awareness of the pilot based on a comparative analysis of the real-time value and the inspected value of each of the indicators.

20. The ground control system of claim 19, wherein the computing device is programmed to alert the pilot and start a timer if the situation awareness of the pilot is assessed to be insufficient, and to generate a command to activate a fail-safe control mode in the remotely piloted aircraft if the pilot fails to remedy an insufficient situation awareness before the timer expires.

* * * * *